June 17, 1947.   F. BRAUN   2,422,524
BEET HARVESTING, TOPPING, TRIMMING AND CLEANING MACHINE
Filed March 29, 1944   4 Sheets-Sheet 1
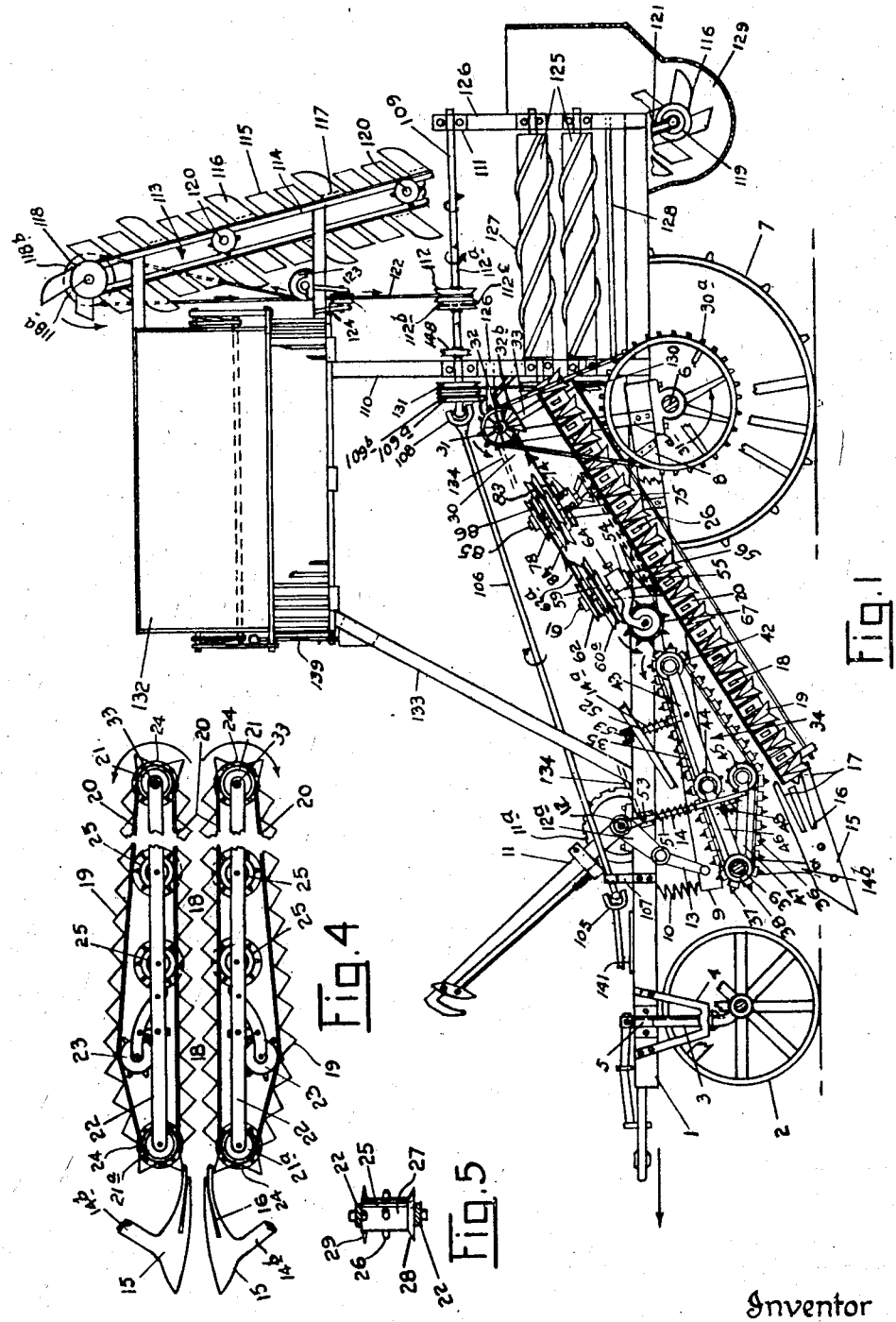
Inventor
Frank Braun,
by
ATTORNEY

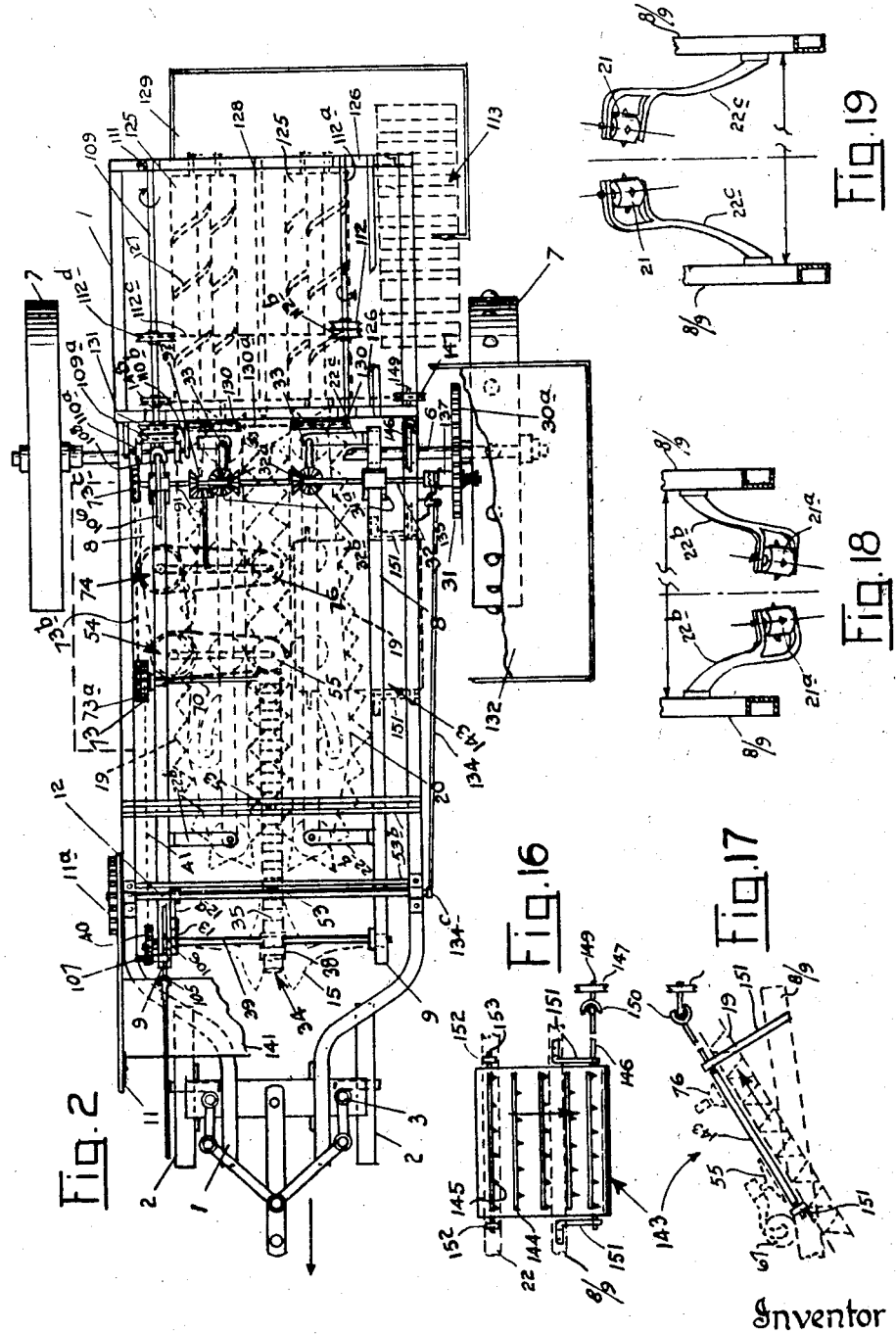

June 17, 1947.　　　　F. BRAUN　　　　2,422,524
BEET HARVESTING, TOPPING, TRIMMING AND CLEANING MACHINE
Filed March 29, 1944　　　4 Sheets-Sheet 3
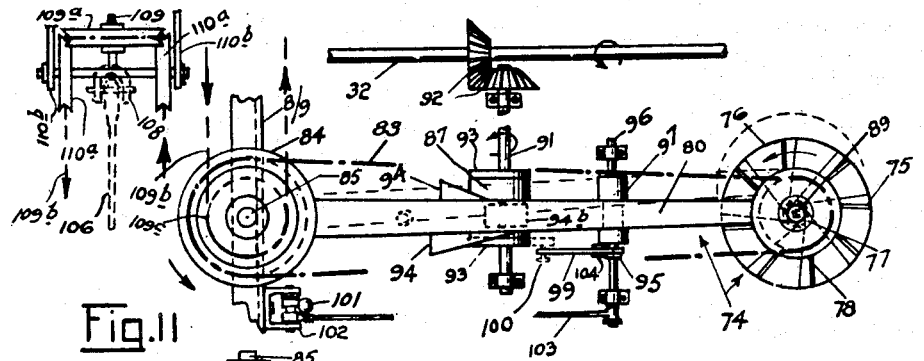
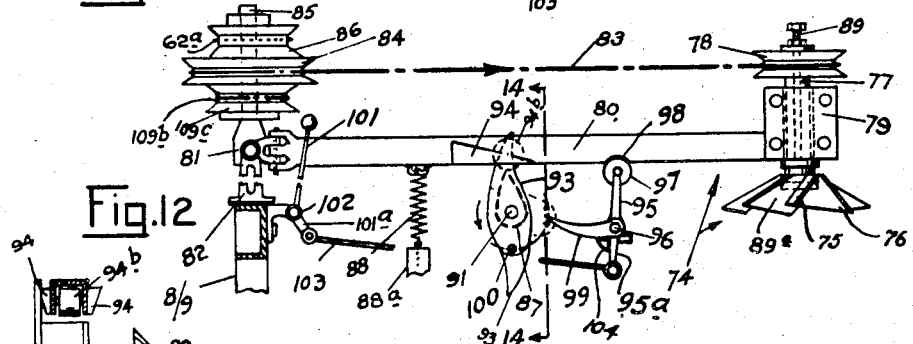
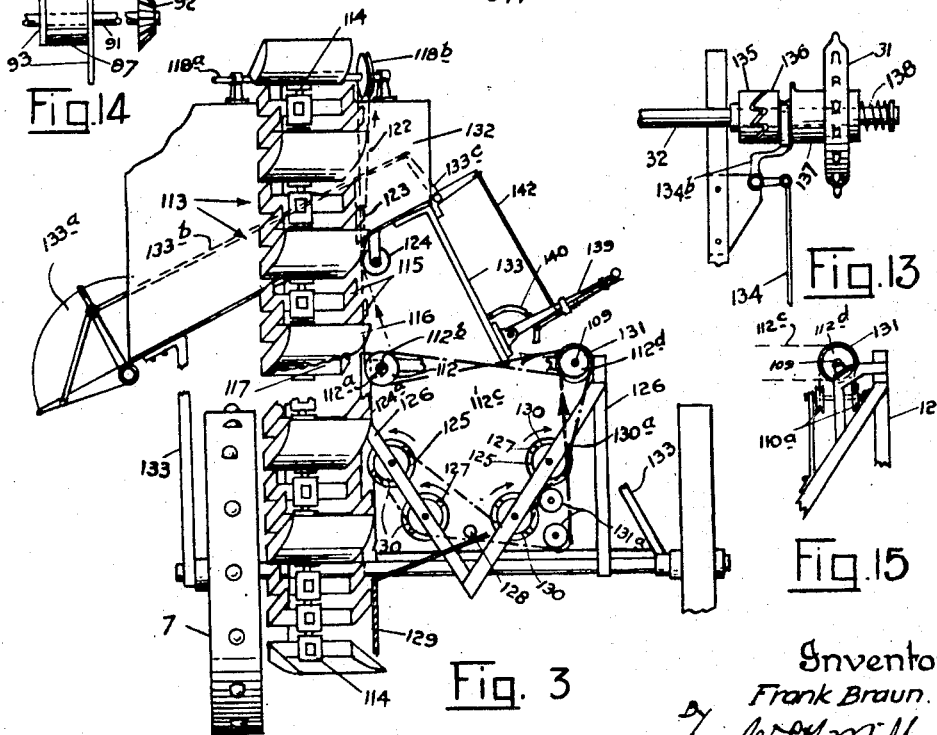
Inventor
Frank Braun.
ATTORNEY

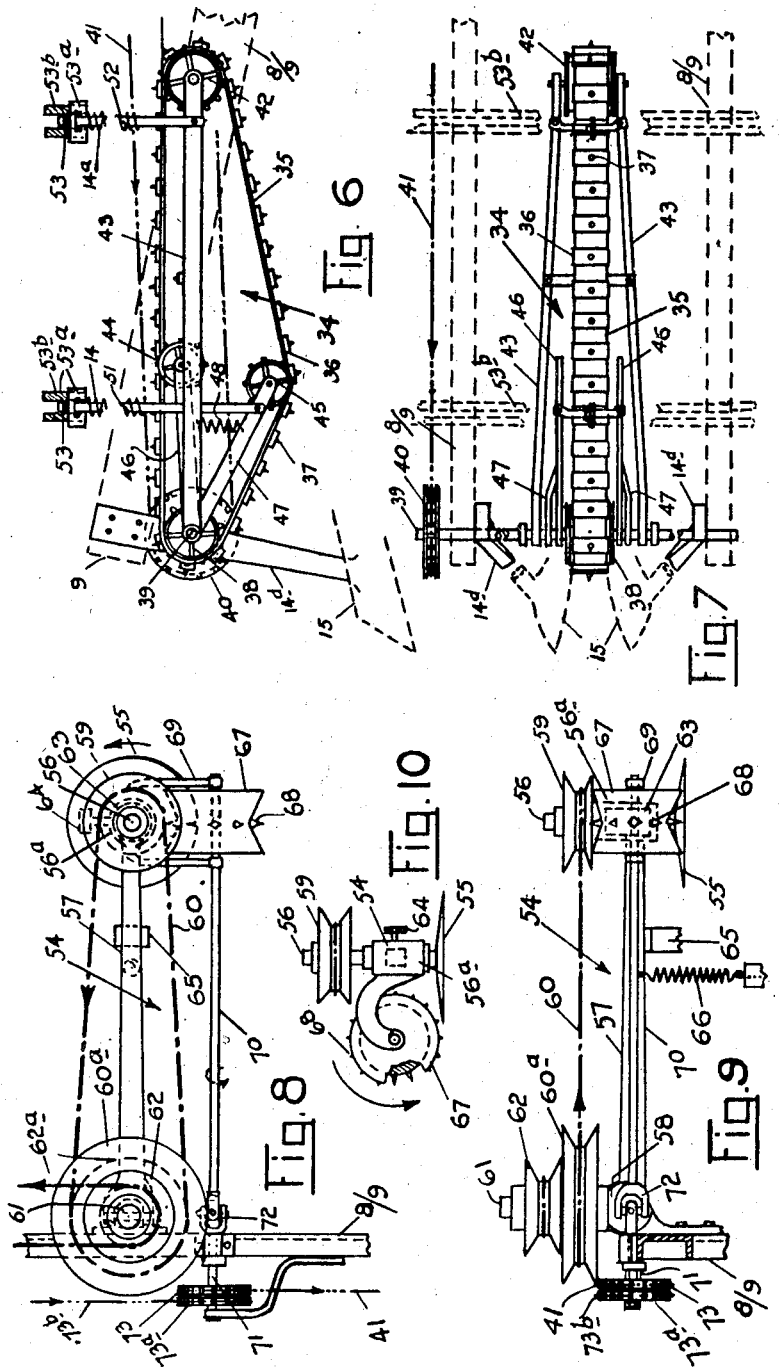

Patented June 17, 1947

2,422,524

UNITED STATES PATENT OFFICE 2,422,524

BEET HARVESTING, TOPPING, TRIMMING, AND CLEANING MACHINE

Frank Braun, Nobleford, Alberta, Canada

Application March 29, 1944, Serial No. 528,569
In Canada November 15, 1943

6 Claims. (Cl. 55—9)

My invention relates to improvements in combined harvesting and topping machines for sugar beets, particularly in relation to the methods adopted, as herein described and claimed, of removing the tops of the beets by a slicing action that forms an important economical feature and object of my invention, since it is the leafy top part together with a minimum portion of the crown of the beet only that is removed in this particular slicing operation and trimming operation of my machine, such trimming resulting in a reduction in the wasted product as compared with the waste from conventional machines.

Another object of my invented machine is that it uproots the beets, tops and trims them, cleans them, and finally loads or piles them in continuous rotation.

A further object and advantage of my machine is that it reduces the cost of the above mentioned operations as compared with conventional types from the fact that it requires comparatively fewer operators to produce the same or even greater volume of output.

Still further objects and advantages are that my machine reduces losses of beet substance, and of smaller whole beets, in comparison with other beet harvesting machines, and that I have made provision for driving the beet conveyor-elevator and trimming machinery from the power take-off of the hauling tractor effecting more silent operation, and that the remaining operational mechanisms are driven by chain drive from the rear wheels of the machine, providing constant relative speeds for such mechanisms in conjunction with the rate travelled over the ground by the machine.

A still further and important advantage is that my machine will deposit the beet tops uniformly on the ground while travelling after slicing and trimming, thus facilitating collection of the refuse for feed purposes.

Similar numerals refer to similar parts throughout the several views.

Fig. 1 shows a side elevation of the machine with certain parts, such as the near side chassis framework, and in part bins etc. removed, and various other parts fragmented and sectionalized for a clearer view of the internal mechanism.

Fig. 2 is a plan view of Fig. 1 showing chassis, wheels, framework, and driving mechanism with other elements relatively indicated.

Fig. 3 is a rear view in part elevation showing beet elevator tank, tank supporting farmwork and cleaning apparatus, with drives etc. in diagrammatic representation only.

Fig. 4 is a fragmented detail in plan of the beet conveyor seen in elevation in Fig. 1.

Fig. 5 is a detail of the chain-guiding sprocket and spool of the conveyor.

Fig. 6 is an enlarged detail of the beet-directing unit for beet disposition above the conveyor.

Fig. 7 is a plan view of Fig. 6.

Fig. 8 shows a detailed plan of the beet topping apparatus in a plane parallel with the surface of the conveyor.

Fig. 9 is a front elevation of Fig. 8.

Fig. 10 is a side view fragmented detail of the beet guiding roller and the beet slicer seen in Figs. 8 and 9.

Fig. 11 is an enlarged detailed plan of the beet trimming apparatus in a plane parallel with the surface of the conveyor.

Fig. 12 is a front view of Fig. 11.

Fig. 13 is an enlarged detail showing the clutch for connection and disconnection between one vehicle wheel and part of the internal mechanisms as described.

Fig. 14 is a detail in section on a plane represented by line 14—14 of Fig. 12.

Fig. 15 is a side elevation in part of the drive and belt guide pulleys for elevator driving.

Fig. 16 is a plan of the refuse conveyor belt and drive pulley.

Fig. 17 is an end view of the refuse conveyor and drive pulley.

Fig. 18 is a front view of the main beet conveyor-supporting brackets at the low end of the conveyor.

Fig. 19 is a front view of the main beet conveyor supporting brackets at the high end of the conveyor.

The chassis framework 1 forming the main supporting member of my machine comprises a two sided and end connected member mounted on a pair of leading wheels 2 set as closely together as will normally straddle one beet row in the field, each said wheel being pivotally supported in castor manner on a vertical post 3 journaled within a bracket member 4 and bearing 5 attached to the forward end of each side member of the chassis framework 1. The rear part of this chassis frame 1 is pivotally mounted on the axle 6 of a pair of main weight carrying wheels 7. An interiorly mounted frame 8 has also two side members bearing rearwardly on the said axle 6, the leading end 9 being free to move arcuately, and being supported by helical springs 10 from the said chassis frame 1. These springs will also assist in raising or lowering this frame 8 for purposes of adjustment hereinafter described. A pawl and a ratchet lever 11 with ratchet mechanism 11a is pivotally mounted on a transversely disposed shaft 12, said shaft being journaled between the side members of the chassis frame 1, and having attached on one of its bearing ends a crank 12a connecting with a link 13 in pivotal manner, the other end of which link is pivotally connected with the forward end 9 of said frame member 8. Helical springs 14 and 14a assist in maintaining a steady support for the frame 8.

A standard 14b is disposed to hang rigidly from each end of each frame member 8—9 to inwardly support a twin bladed beet lifting shovel 15, said shovel being slotted at 16 for self cleaning purposes and to avoid adhesion of moist soil to the blades of same, the leading points of which blades being set wider apart than the body of the shovel in such shape as to partly envelope any sized beet during digging and lifting operations. Prongs 17 extend from the rear top and bottom edges of the said blades 15 in order to guard against small sized beets escaping from the machine. The blades 15 may be adjusted as to distance apart by any convenient means.

An inclined twin-type chain conveyor, seen in elevation in Fig. 1 and in plan in Fig. 4, is aligned immediately in rear of the prongs 17 of the lifting shovel blades 15, and as the beets emerge therefrom they are caught in an upright position in chain-formed pockets 18. The pocket forming members comprise ridge bars 19 secured across every second link of each endless chain 20, and are specially shaped to conform in general with the beets' shapes when such ridge members are facing one another in their travel.

In each symmetrically disposed half portion of this conveyor these chains run in parallel pairs over sprocket wheels 21 and 21a mounted at each end and between upper and lower conveyor frame members 22, pair 21 at the upper end of the conveyor and pair 21a at the lower end, and also over pivotally adjustable sprocket wheels 23 for taking up the slack in the said chains. The conveyor frames 22 with chain sprockets 21a are suspended from hanger brackets 22b (Fig. 18) at the forward or leading and low end of the conveyor. Frames 22 with sprockets 21 are supported on brackets 22c (Fig. 19) at the trailing end of the conveyor. These brackets spring inwardly from the longitudinal side members 8—9 to the inner faces of which they are rigidly attached. Sprockets 21 and 21a are axially tilted in their bearings within the said brackets 22b and 22c respectively, and in such a way as to allow the chain 20 and pockets 18 to conform to the beet shape as it is dug up from the ground. The end sprockets 21 are provided with projected flanges 24 at the lower rim of the sprocket hub to retain the chains in their respective places under load pressure. Sprocket wheels 25 are rotatably mounted between the said members 22 intermediately between the end sprockets 21, and are disposed approximately below certain topping and trimming devices described later. These same sprocket wheels 25 are rotated by the chains 20, and have their teeth 26 projecting from a spool body 27, which spool body has a chain guarding lower flange 28 and a series of spikes 29 projecting therefrom around the top periphery. The object of these spikes is to maintain the beets in position under pressure of the topping device, as well as under the trimming device.

The inclination of this conveyor is upwardly from the front of the machine towards its rear, and it is driven by means of a chain 30 from a sprocket 30a attached to one of the side machine wheels 7 as the latter travels over the ground, said chain driving a second sprocket 31 mounted on an overhead countershaft 32, which shaft is mounted on upright members 31a attached at their bases to the frame 8, the drive being transferred to the conveyor through bevel gears 32a (Fig. 2) on this same shaft 32, and 32b on the top end of two upright shafts 33 to rotate the said sprocket wheels 21 which are secured to the bottom end of the said shaft 33, this drive being duplicated for simultaneously driving each half of the conveyor, all from the same overhead shaft 32. Thus the speed of this conveyor corresponds with the speed of travel of the whole machine.

As the beets leave the lifting shovel they are assisted to enter and travel in an upright manner along the said conveyor by means of a beet directing unit 34 installed immediately above the leading sections of the said conveyor. This directing unit comprises a broad linked chain 35 having metal lugs attached transversely across its links, said lugs having spikes projecting therefrom to assist the beets in their passage from lifter to conveyor by down pressure so that the beets are maintained in an upright position. The beet contacting portion of the chain 35 travels in a plane parallel and above the inclined conveyor, and passes over and is driven by a sprocket 38 affixed to a rotatable shaft 39 transversely bearing on and between the forward ends of the inner frame members 8—9, which shaft 39 is rotated by an outboard sprocket 40 thereon, and which sprocket is itself driven indirectly by a chain 41, as later described from the countershaft 32. The elevation of the lower portion of this unit 34 must be allowed to vary to correspond with the level of the top of each beet passing into and through the conveyor as the machine travels forward. This unit comprises the said sprocket 38, an oppositely disposed end chain supporting sprocket 42, and both said sprockets being supported between longitudinal brace members 43, and a system of chain tightening idling toothed pulleys 44 and 45. These toothed pulleys 44 and 45 are mounted on and between arms 46 and 47 respectively disposed on each of the chains 36, each said arm pivotally bearing on the said shaft 39 and with a compression spring 48 between each two sets of arms. It is this spring 48 that permits handling successfully the variably sized beets by varying the space between the conveyor top and this latter unit 34. To provide for smooth running this whole unit 34 is cushioned against the more rigid framework of the machine by means of the aforementioned springs 14 and 14a enclosing guiding slidable rods 51 and 52 respectively, the ends of which rods are pivotally attached one to each of the said arms 47 and braces 43 respectively, and are slidably connected with the side members of chassis 1. These rods 51 and 52 have pins 53 through their top ends as a means of support by suspension of the whole unit 34, and also they will prevent any contact between this unit and the conveyor. These said rods pass through eye pieces 53a attached to cross bars 53b bridging the side chassis members.

A beet topping device 54 forming a component part of my invention is located immediately in rear of the said beet directing unit 34 and above the conveyor unit, and comprises a variable height rotatable slicing disc 55 secured to a short upright shaft 56 and disposed in a plane corresponding with the plane of the said conveyor. This shaft 56 rotating anticlockwise as viewed in Fig. 8 is supported in an upright bracket 56a forming the enlarged end of an arm 57, which arm is hinged at its opposite end at 58 to the movable frame 8—9 for up and down radial movement therewith. A system of bolt driven pulleys drives this slicing device and consists of a V-pulley 59 attached to the top of the shaft 56, this pulley is driven by a belt 60 from an intermediately disposed V-pulley 60a supported on an upright shaft 61 perpendicularly attached to said arm 57. A V-pulley 62 is also mounted on said shaft 61 above the V-pulley 60 which pulley 62 is driven by means of a belt 62a from the power take-off later described. A bushing 63 fits into the bracket 56a in which the said shaft 55 rotates, and a thumb screw 64 is screwed through the bracket 56a for the adjustment of this slicing or beet topping disc 55 as to its distance from the guiding roller 67 in order that a uniform thickness may be sliced from the beet top. A stop 65 is conveniently attached to the nearest part of the frame 8—9, being disposed below the said arm 57 to prevent the disc 55 from falling below the adjustably predetermined level for actual leaf top slicing. A tension spring 66 is attached to the arm 57 and is anchored to any convenient part of the frame 8—9 in order to maintain an adequate amount of down pressure of the disc 55. This slicing disc is guided for its slicing operation by the roller 67, which roller has a very obtuse angled face periphery of V-shape form, and has spikes 68 aligning its lesser face periphery to avoid slipping whilst rolling over the beet tops prior to their being topped. This roller 67 is axially pivoted between a pair of bracketed arms 69 projecting from the swinging arm 57 which together bear on a shaft 70, and its primary object is to regulate the height of the topping disc for topping the approaching beet to the desired thickness. The shaft 70 is coupled to a short driving shaft 71 with a universal joint 72 for corresponding movement with the arm 57. To this shaft 71 are attached twin sprockets 73 and 73a, the sprocket 73 being driven by a chain 73b from a sprocket 73c on the end of the shaft 32, by which means the beets are fed to the slicer at a rated speed corresponding with the rate of travel of the machine over the ground. Sprocket 73 drives the unit 34 through the said chain 41 as driven by the sprocket 40.

A beet topping and trimming device 74 is disposed immediately in rear of the said slicing device, the important purpose of which is to thoroughly trim the beet top surface following the slicing operation for removal of any leafy parts of the crown to a minimum thickness as a matter of economy. This trimming unit comprises a plurality of knife edged blades 75 mounted on the leading edges of a similar number of rotatable vanes 76, each such vane sloping downwardly in more or less a cone shape formation, the trailing edge of each vane slightly overlapping the following blade for shedding the beet peelings therebetween, all in such a manner so that these rapidly rotating blades and vanes envelope the top irregularly surfaced portion of the beet for the thorough trimming of same. This trimming operation is accomplished as follows: The blades 75 are mounted tangentially on and project from an upright end central shaft 77 having a V-pulley attached to its upper end, the intermediate portion of this shaft being journaled in a ball bearing 79 forming the end part of a horizontal arm 80, the opposite end of which arm has attached thereto a universally hinged member 81 mounted on a pedestal 82 attached to the frame 8—9. This universal connection allows the said arm 80 to be raised, lowered, or swung sideways. The pulley 78 is driven by a V-belt 83 drive-connected with a pulley 84 mounted on an upright shaft 85 affixed to the said hinge member 81 and rotatable in an anticlockwise direction as viewed in Fig. 11. A V-pulley 86 is attached to the upper face of the said pulley 84 for driving the beet slicing unit pulley 62 by means of the belt 62a.

The necessary intermittent motion of the said arm 80 is imparted thereto by means of a cam 87 which is timed with the conveyor speed as hereinafter described. A spring 88 connects the arm 80 with the frame 8—9 (not shown in these Figs. 11 and 12) in convenient manner as represented by 88a, to assure contact therebetween and also to steady the arm during beet trimming operations. The cutting depth for this trimming part of the process is adjustably maintained as required by a set screw 89 screwable into the top and through the shaft 77, which shaft is bored and threaded for this purpose, the said screw having a flat head 89a extending below the bottom of this shaft within the cone-shaped trimmer head, which head 89a will contact the top of the beet, and is a means of regulating the depth of the trim.

The timing mechanism for this trimming unit consists of the said cam 87 which is mounted on a shaft 91 journaled on the frame 8—9 (not shown in Figs. 11 and 12), and is driven by crown wheels 92 from the countershaft 32 at the same varying speed rate as the travelling machine, and therefore allied with the beet conveyor speed rate, said shaft 91 being axially perpendicular to and below the said arm 80. The cam 87 has guiding rotatable flanges 93 projecting in irregular contours around each of its side faces, and the arm 80 has ridges 94 angularly projecting therefrom contacting said cam faces 93, one on each side of the arm, to impart the necessary alternating vertical and horizontal movements to this said arm on rotation of the cam. When the beet that is being carried by the conveyor arrives directly under the trimming unit the rotary knives will be automatically lowered to trim the top of the beet, and at the same time shifted slightly sideways or more correctly lengthwise in relation to the travel of the conveyor to follow the beet for a predetermined very short distance, by the contacts of said flanges 93 and said ridges 94, in order that the knives may complete the peeling operation. The cam 87 will lift the knives ready for the reception of the next beet by contacting a roller 94b mounted within a slot in the arm 80.

An auxiliary means for raising the said knives 75 is provided in order to allow for those beets with a scanty growth of leaves. This means comprises a lever 95 fulcrumed between its ends to bear on a shaft 96 journaled below the arm 80 conveniently on the frame 8—9 and disposed axially parallel with the shaft 91. At the upper end of the arm of lever 95 is a roller 97 bearing within a notch 98 in said arm 80. A trip member 99 bears on the fulcrum shaft 96 and is rigidly attached to the said lever 95 which trip member when contacted by a lug 100 projecting from the rotatable flange 93 will automatically lower the unit into its operating position at such times as the beet which does not need trimming and is carried by the conveyor, passes away from under the knives, and when the beet next in line approaches the center position below the knives 75. The engagement of the roller 97 with the notch 98 is manipulated by hand through the operation of a lever 101 pivotally mounted at the point 102 on the frame 8—9 in a position conveniently arranged for handling by the machine operator, said lever 101 being connected through an extending lever 101a with the lever arm 95a by a rod 103. A stop 104 limits the down position of the trip member 99, being mounted on the lever arm 95a. The disengagement of the said roller 97 is accomplished automatically by the trip member 99 at predetermined periods of time.

The power supply means for the various rotatable mechanisms of this machine referred to throughout as the power take-off comprises a square shaft and sliding sleeve type of coupling, with conventional type of tractor drive take-off connection, none of which is shown as not forming part of this invention other than its necessity from an operational point of view. For the power take-off cooperation a universal joint 105 (Fig. 1) is coupled to join the take-off shaft with a shaft 106 running longitudinally along one side of the machine to rotate as shown by the arrow in Fig. 1 and mounted on an upright standard 107 attached to the chassis. A universal coupling 108 is disposed at the opposite end of the shaft 106 to which coupling is attached a horizontal drive shaft 109 journaled on upright standards 110 and 111 at the rear end of the machine.

Each of these beet topping and beet trimming mechanisms is driven from an outward mounted V-pulley 109a on the near end of the said shaft 109 (Fig. 11). This power take-off drive pulley drives a V-pulley 109c attached to the underside of the said pulley 84 by means of a belt 109b. Intermediate idler or guide pulleys 110a are bracketed to the rear framework of the machine being adapted to accommodate the necessary change in direction of the belt 109b, and which brackets are shown at 110b.

A pulley 112 on the shaft 109 drives an elevator 113, which arrangement comprises an endless chain 114 with U-shaped cross bars 115 attached to every link of the chain. Every third such cross bar forms the supporting member for and the side checks of buckets 116, the uprights of which bars 115 being longer on those which form parts of the said buckets than the intermediate bars.

A transverse plate 117 in this elevator chain is attached to the same third intervaled cross bar in succession, which plate, together with the two U-shaped cross bars 115 complete a bucket unit. The chain 114 runs over a sprocket 118, the drive sprocket and over a tail sprocket 119, and rides over supporting idler sprockets 120, bearably supported between the elevator side frame members 121, as do also the elevator sprockets. Suitable tightener means (not shown) are incorporated in connection with the bottom sprocket 119 and the frame members 121. The upper sprocket 118 is mounted on the shaft 118a driven by a V-pulley 118b affixed thereto, which pulley is driven by a belt 122 from the pulley 112, passing intermediately over guide pulleys 123 and 124 mounted on the machine framework. This pulley 112 is mounted on a shaft 112a rotatably mounted on the frame uprights 124a. A pulley 112a is mounted adjacently to the pulley 112 on the shaft 112a which is driven by a crossed belt 112c from a pulley 112d mounted on and driven in clockwise direction as viewed in Fig. 3 by the power take-off shaft 109, which latter is driven by the shaft 106 as mentioned.

A beet cleaning unit set at the rear of the machine adjacent to the said elevator cleans the beets as they emerge from the beet conveyor unit on their way to the elevator 113. This cleaning unit comprises a number of pairs of inclined rotatable cleaning rollers 125 mounted at each of their ends on two V-shaped frames 126, each such roller on one side of each V-frame being spirally bounded by attached ridge members 127 in similarly directioned formation opposing the downfalling beets, and each roller on the opposite side of each V-frame is mounted to rotate in a symmetrically opposite direction to the above mentioned rollers. These swiftly rotating spiral ridges 127 are for the removal of dirt clinging to the beets by violently agitating the beets from side to side, and to force them in a rearward direction. A rod 128 is disposed axially parallel with these rollers and below the lowest pair of such to maintain the beets in position and to slow up their passage whilst being churned between the rollers. The roller supporting V-frames are attached to the standards 110 and 111, and are braced to the machine framework. The beets eventually gravitate towards a chute 129 to be dumped into the said buckets 116. The rollers 125 are driven by outboard mounted pulleys 130 from an outboard mounted pulley 131 on the said shaft 109, all shown diagrammatically in Fig. 3. A system of idling pulleys 131a guides the drive belt 130a. From the top of the elevator 113 the clean beets are delivered to a bin 132 mounted above the machine on standards 133. This bin is hopper bottomed and is disposed at a suitable height for truck loading, a door 133a in the bin being provided to be remotely controlled from the operator's platform as later described.

The rear wheel sprocket 30a and its chain drive 30 are controlled through a slidable clutch of teeth-engaging type. This clutch is operated by means of a rod 134 which is pivotally attached to a lever arm 134c affixed to the outboard end of the shaft 12 on the opposite side of the machine to the pawl and ratchet lever members 11, so that there is direct coaction between the crank arm 13 lifting the shovel 15 and the said mechanism-activating clutch. The clutch comprises a toothed collar 135 affixed to the shaft 32 and engaging a toothed member 136 forming an extension of the hub 137 of the sprocket 31 and slidable on the shaft 32. A spring 138 on the sprocket mounting shaft maintains the engagement of the said sets of clutch teeth when required. A bell crank 134b supported from that side member 1 on this particular side of the machine is pivotally controlled by means of the said rod 134 for the operation of the said clutch in conventional manner. A hand lever 139 with ratchet and pawl mechanism 140 is pivotally mounted on frame members 133 as a means of remote control for the operation of the door 133a. This door is operated by means of a rod 133b connecting with a bell crank 133c, said bell crank being operated by said lever 139 through a connecting rod 142.

A refuse conveyor belt 143 is roller mounted on the top of one of the side members 8—9 and on the adjacent upper conveyor member 22, and travels in a transverse direction to that of the machine to receive the beet tops and peelings from the slicing and trimming devices, and distributes them to one side of the machine. This conveyor has a ridge member 144 mounted at regular intervals along its outer face to each of which spikes 145 protrude to assist in the disposal of the refuse. The forward roller spindle 146 is driven by a pulley 147 belt driven from the shaft 109 through a pulley 148 thereon, pulley 147 being mounted on a countershaft 149, which latter is bearably mounted on the rear framework of the machine. A universal joint 150 couples the shaft 149 and the spindle 146 together in flexible manner. Brackets 151 support the said spindle 146 on the frame 8—9, and brackets 152 support the rearward conveyor roller spindle 153 on the said conveyor member 22.

It is hereby understood that I have endeavored to set forth the best embodiment of my invention, and that what has been shown and described is to be taken as a preferred example of the same, and that obvious changes as to arrangement of various parts, sizes and shapes may be made without departing from the intending scope of the following claims.

I claim:

1. A mobile harvesting and topping machine of the type described comprising in combination a chassis frame; a pair of leading wheels journaled within the said frame; a pair of axle mounted rear wheels carrying the greater load of the machine; a drive sprocket on one of said rear wheels; a chain and sprocket combination driven from said rear wheel sprocket; a countershaft driven by said chain and sprocket; a hand manipulated clutch between said chain and sprocket and said countershaft; a twin-bladed beet digging and lifting shovel at the leading end of said machine for transference of the beets from the ground to the machine and slotted for shedding dirt; means to adjust the height of said shovel for digging operations; a symmetrically disposed and operated sprocket driven and sprocket guided twin-type endless chain beet conveyor in rear of said shovel to receive beets therefrom, said drive sprockets being driven by crown wheels and shafts from said countershaft; an interiorly mounted height adjustable frame rearwardly pivoted on and swingable arcuately from the axle of said rear wheels and supporting said conveyor with said shovel attached; an endless chain-and-spike beet directing unit supported by and driven through sprockets mounted on the arms comprising said interior frame; a rotatable self adjusting beet-top slicing disc mounted above said conveyor on said interior frame; spirally ridged beet cleaning rollers receiving therebetween topped and trimmed beets from said conveyor; and a bucket elevator for delivery of cleaned beets to an elevated bin for disposal.

2. A beet harvester, topping and trimming machine comprising in combination, a four-wheel mounted chassis; an interiorly mounted height adjustable frame rearwardly pivoted on and to swing radially from the transverse chassis mounting axle of the rear pair of said wheels; manually operated lever, pawl and ratchet means mounted on said chassis to raise and lower said pivoted frame; a beet digging and lifting shovel rigidly suspended from the forward end of said pivoted frame; a twin-type beet conveyor with endless chains, said conveyor being mounted on said pivoted frame to receive the beets from said shovel in upright manner in pockets formed between opposing said chains; an endless travelling chain beet-directing unit supported on the arms of said pivoted frame and disposed above said conveyor; sprockets mounting and for the purpose of driving said unit; spiked lugs mounted on said chain to assist in and maintain progress of beets through the machine; idler sprockets guiding said chain; frame members supporting said sprockets; swingable arm-supported sprockets engaging said chain in a chain-tightening manner; a countershaft mounted on said pivoted frame and driven by one of the rear wheels of the machine; clutch means controlling the operation of said countershaft; means to drive said twin type conveyor from said countershaft; a circularly bladed rotatable beet top slicing unit above said conveyor and arm-supported from said interior pivoted frame with means to drive same indirectly from a power take-off driving pulley; a bladed rotatable beet top-trimming unit with radial knife-edged trimming blades above said conveyor in rear of said slicing unit and arm-supported from said interior pivoted frame; means to drive said trimming unit indirectly from a power take-off pulley; and means for beet cleaning between revolving rollers mounted on the rear of said chassis and means for cleaned beet elevating by a chassis mounted bucket elevator, and means for beet top disposal by a chassis mounted conveyor, each such means being operated indirectly from a power take-off driving pulley.

3. A beet harvesting, topping, trimming and cleaning machine comprising in combination a chassis framework mounted on a pair of leading wheels journaled thereto and a pair of rear axle mounted wheels, one of which latter is the power transmission wheel communicating power by chain and sprocket to a power transmission countershaft; an interiorly mounted height adjustable frame rearwardly pivoted on and to swing radially from the axle of said rear wheels and supporting said countershaft; a spring partially supporting said pivoted frame from the chassis framework; hand operated crank and lever means with pawl and ratchet control to support and to pivotally adjust height of said frame with respect to ground level; a beet digging and lifting shovel rigidly suspended from the forward end of said pivoted frame; a twin-type endless chain beet conveyor travelling in symmetrical directions and sprocket mounted on said adjustable frame in rear of said shovel, and bevel gear and shaft driven from said countershaft; ridge bars on said endless chains forming beet holding pocket shaped receptacles in between the opposing said conveyor chains; an endless chain beet directing unit pivotally supported between the arms of said pivotally adjustable frame and disposed above said conveyor and spring-suspended from said machine chassis; sprockets shaft-mounted on said frame for driving said beet directing unit; driving means for said sprockets from said countershaft; a rotatable beet slicing unit self-adjustable for the different sizes of beets adjacently disposed in rear of said directing unit and arm-supported from said pivoted frame above said conveyor and driven from a power take-off pulley; a power driven spiked guiding roller sprocket and chain driven from said countershaft cooperating with and to maintain proper beet feeding to said slicing unit, and to assure uniform depth of beet slicing; a rotatable beet top trimming unit above said conveyor in rear of said slicing unit arm-supported from said pivoted frame and driven by means of a power take-off pulley; and trip means for automatically tilting said trimming unit operated by a cam as rotated by shaft and crown gears from said countershaft cooperating and timed in unison with the travelling speed of said conveyor unit.

4. A beet harvesting machine as in claim 3 together with an auxiliary manually operated means for lifting said trimming unit away from the beet tops by lever cooperation with said unit supporting arm; and a chassis-mounted transversely-disposed beet trimmings disposal belt conveyor with refuse clearing slats and prongs indirectly driven from a power take-off pulley.

5. A beet harvesting, topping, trimming and cleaning machine for mobile operation, comprising in combination a four-wheel axle mounted chassis framework; an interiorly mounted frame arcuately pivoted on the rear axle of the machine and suspended by spring and crank means from said chassis framework; means for adjusting the height of the said interiorly mounted frame from the ground level through manipulation of said crank; a beet digging and lifting shovel suspended from said interiorly mounted frame; a beet conveyor in rear of said shovel with a beet directing unit above said conveyor; means to mount said conveyor and said directing unit on said interiorly mounted frame; means to drive said conveyor and said directing unit from a countershaft driven by chain and sprocket from the rear wheels of the machine; a beet topping unit and a beet trimming unit, each being arm-supported from said interiorly mounted frame, and driven from a power take-off pulley in connection with belt guiding pulleys; spirally ridged beet cleaning rollers delivering to a beet elevator in rear of said trimming unit, and all operated by the same power take-off pulley drive shaft of a tractor or other power supply unit; an elevated bin mounted on said chassis framework fed by said elevator for beet storage and disposal; an outlet door from said bin; hand lever pawl and ratchet mechanism for the operation of said bin door; and clutch means for control of the coaction between the rear wheel sprocket drive and said countershaft.

6. A beet harvester of the type described including a main traction wheel mounted chassis frame, means for uprooting beets, twin-type endless chain beet conveyors arranged pairwise and mounted pivotally in coaction with said beet uprooting means; sprocket and chain means to drive said conveying means from a sprocket mounted on one chassis mounting traction wheel of the machine; means by chain formed pockets to maintain upright positions of beets within said chain conveying means and driven from the conventional power take-off of a hauling tractor; self adjusting rotatable blade slicing means mounted in cantilever manner from a swingable frame mounted interiorly with respect to said chassis and driven from said power take-off to top-slice the beets; adjustable beet-top trimming means driven from said power take-off and mounted in cantilever manner from a swingable frame mounted interiorly with respect to said chassis; ridged beet cleaning rollers receiving trimmed beets from said conveying means and rotated by said power take-off; a chassis frame mounted bucket elevator driven by said power take-off for deposition of cleaned beets to a bin also mounted on the machine chassis frame; and controlled means for the discharge of beets from said bin.

FRANK BRAUN.